(12) United States Patent
Kamel et al.

(10) Patent No.: US 6,628,958 B1
(45) Date of Patent: Sep. 30, 2003

(54) METHOD FOR ADJUSTING THE TRANSMIT POWER LEVEL DURING SOFT HANDOFF IN WIRELESS COMMUNICATION SYSTEMS

(75) Inventors: Raafat Edward Kamel, Westfield, NJ (US); Martin Howard Meyers, Montclair, NJ (US); Carl Francis Weaver, Hanover Township, Morris County, NJ (US); Xiao Cheng Wu, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/396,947

(22) Filed: Sep. 15, 1999

(51) Int. Cl.$^7$ ................................. H04Q 7/20
(52) U.S. Cl. .................... 455/522; 455/437; 455/245.1; 370/331
(58) Field of Search ................. 455/522, 422, 455/423, 428, 432, 434, 436, 442, 13.4, 38.3, 69, 435, 437–439, 24, 238.1, 245.1; 370/331

(56) References Cited

U.S. PATENT DOCUMENTS 5,056,109 A * 10/1991 Gilhousen et al. .......... 370/311

(List continued on next page.)

FOREIGN PATENT DOCUMENTS

EP 0 897 225 A2 2/1999 ........... H04B/7/005

(List continued on next page.)

OTHER PUBLICATIONS

Hashem, Bassam, et al., *On the Capacity of a Cellular DS/CDMA System Under Slow Multipath Fading and Fixed Step Power Control*, IEEE (1997) pp. 352–355.

*Primary Examiner*—Lee Nguyen
*Assistant Examiner*—Charles Craver
(74) *Attorney, Agent, or Firm*—Irena Lager; David W. Herring, Jr.

(57) ABSTRACT

A base station in a soft handoff adjusts its transmit power level by a first amount if the base station is participating in a soft handoff and by a second amount if the base station is not participating in the soft handoff, i.e. in simplex mode. The first and second amounts are different. In one embodiment of the invention, the adjustment is performed by using a down-step size that is larger in magnitude than an up-step size when the base station is in soft handoff. The transmit power level is then adjusted by the smaller up and larger down step sizes when the base station receives an indication to adjust the transmit power level. The step sizes used when the base station is in simplex mode is larger than the up-step size and smaller than the down step size. In another embodiment, when the base station is in soft handoff, the adjustment is performed by adjusting the transmit power level by the same step size as used during simplex mode when the base station receives an indication to adjust the transmit power level and then reducing the result by a reduction amount. The order of these two steps can be reversed, and the transmit power level can be first reduced by the reduction amount and then adjusted by the same step sizes as used during simplex mode. The reduction amount has a magnitude greater than zero and smaller than the step size. The method of adjusting the base station transmit power level by different amounts based on whether the base station participating in a soft handoff can be used with the method of programming each base station in a soft handoff with a threshold power level to constrain the power transmitted by the base station on the forward link. When the threshold power level is a minimum-threshold power level, each base station maintains its transmit power level at or above the minimum-threshold power level. When the threshold power level is a maximum-threshold power level, each base station maintains its transmit power level at or below the maximum-threshold power level. The threshold power level can be either an adjustable or a fixed threshold power level.

28 Claims, 9 Drawing Sheets

U.S. PATENT DOCUMENTS

| | | | | |
|---|---|---|---|---|
| 5,265,119 A | * | 11/1993 | Gilhousen et al. | 340/7.33 |
| 5,267,262 A | * | 11/1993 | Wheatley, III | 340/7.33 |
| 5,485,486 A | * | 1/1996 | Gilhousen et al. | 370/335 |
| 5,715,526 A | * | 2/1998 | Weaver et al. | 455/103 |
| 5,878,350 A | * | 3/1999 | Nakamura et al. | 455/442 |
| 5,884,187 A | * | 3/1999 | Ziv et al. | 455/442 |
| 5,893,035 A | * | 4/1999 | Chen | 455/522 |
| 5,940,430 A | * | 8/1999 | Love et al. | 375/200 |
| 5,940,743 A | * | 8/1999 | Sunay et al. | 370/331 |
| 5,982,760 A | * | 11/1999 | Chen | 370/335 |
| 6,035,209 A | * | 3/2000 | Tiedemann, Jr. et al. | 455/115 |
| 6,075,974 A | * | 6/2000 | Saints et al. | 455/522 |
| 6,085,108 A | * | 7/2000 | Knutsson et al. | 455/522 |
| 6,144,861 A | * | 11/2000 | Sundelin et al. | 455/522 |
| 6,173,162 B1 | * | 1/2001 | Dahlman et al. | 455/69 |
| 6,173,188 B1 | * | 1/2001 | Kim | 455/522 |
| 6,253,085 B1 | * | 6/2001 | Bender | 455/442 |
| 6,259,927 B1 | * | 7/2001 | Butovitsch et al. | 455/522 |
| 6,307,849 B1 | * | 10/2001 | Tiedemann, Jr. | 370/332 |
| 6,317,587 B1 | * | 11/2001 | Tiedemann et al. | 455/115 |
| 6,330,456 B1 | * | 12/2001 | Hashem et al. | 455/522 |
| 6,351,650 B1 | * | 2/2002 | Lundby et al. | 455/522 |

FOREIGN PATENT DOCUMENTS

| | | | | |
|---|---|---|---|---|
| WO | WO 98/56120 | 12/1998 | | H04B/7/00 |
| WO | WO 98/56200 | 12/1998 | | H04Q/7/30 |
| WO | WO 98/59433 | 12/1998 | | H04B/7/005 |
| WO | WO 00/49728 | 8/2000 | | H04B/7/005 |

* cited by examiner

METHOD FOR ADJUSTING THE TRANSMIT POWER LEVEL DURING SOFT HANDOFF IN WIRELESS COMMUNICATION SYSTEMS

BACKGROUND OF THE INVENTION

1. Field of the Invention

The present invention relates generally to wireless communication systems and, in particular, to forward link power control during soft handoff in wireless communication systems.

2. Description of the Related Art

Wireless communication systems employ Code Division Multiple Access ("CDMA") modulation techniques to permit a large number of system users to communicate with one another. Such systems work because each signal is coded with spreading sequences, such as with pseudo-random noise ("PN") sequences, and orthogonal spreading sequences, such as Walsh codes. This coding permits signal separation and signal reconstruction at the receiver. In typical CDMA systems, communication is achieved by using a different spreading sequence for each channel. This results in a plurality of transmitted signals sharing the same bandwidth. Particular transmitted signals are retrieved from the communication channel by despreading a signal from all of the signals. Despreading is achieved by using a known user despreading sequence related to the spreading sequence implemented at the transmitter.

FIG. 1 illustrates CDMA system 100. The geographic area serviced by CDMA system 100 is divided into a plurality of spatially distinct areas called "cells." Although cells 102, 104, 106 are illustrated as a hexagon in a honeycomb pattern, each cell is actually of an irregular shape that depends on the topography of the terrain surrounding the cell. Each cell 102, 104, 106 contains one base station 112, 114, and 116, respectively. Each base station 112, 114, and 116 includes equipment to communicate with Mobile Switching Center ("MSC") 120, which is connected to local and/or long-distance transmission network 122, such as a public switch telephone network (PSTN). Each base station 112, 114, and 116 also includes radios and antennas that the base station uses to communicate with mobile terminals 124, 126.

When a call is set up in CDMA system 100, mobile terminal 124 communicates with the base station from which mobile terminal 124 receives the strongest pilot signal, in this case base station 112. Base station 112 and mobile terminal 124 communicate over a forward link and a reverse link. The forward link includes communication channels for transmitting signals from the base station to the mobile terminal, and the reverse link includes communication channels for transmitting signals from the mobile terminal to the base station. Base station 112 transmits control information to mobile terminal 124 over a communication channel, referred to herein as a forward control channel, and it transmits voice or data over a communication channel, referred to herein as a forward traffic channel. Mobile terminal 124 transmits control information to base station 112 over a communication channel, referred to herein as a reverse control channel, and it transmits voice or data over a communication channel, referred to herein as a reverse traffic channel. The signals on the communication channels are organized in time periods, referred to herein as frames. Frames are typically 20-millisecond (ms) in length. Forward traffic frames are frames transmitted over the forward traffic channel, and reverse traffic frames are frames transmitted over the reverse traffic channel.

The number of signals that can be transmitted simultaneously is limited by each of the transmitted signals' fraction of the total power, referred to herein as the power fraction. Thus, reducing the power fraction of each of the signals increases the capacity of the wireless communication system. However, reducing the power fraction of a signal increases the number of errors in that signal. A goal of power control is to adjust the power level of the signals in such a way as to keep the power fractions as close as possible to a level that allows the system to maximize capacity while keeping the number of errors in the signal at an acceptable level. Forward link power control varies the power output of the base station to maintain a constant frame error rate at the mobile terminal. A frame error occurs when one or more uncorrectable bit errors occur in a frame. The frame error rate is the number of frame errors divided by the total number of frames observed. A targeted frame error rate, typically between 1% and 3%, depending on the desired system performance, is selected to minimize power without compromising signal quality. If the frame error rate exceeds the targeted frame error rate, the usefulness of the signal is reduced and the power level is increased to decrease the number of frame errors. If the frame error rate is below the targeted frame error rate, the power level exceeds the optimum power level, and the power level is reduced.

When the mobile terminal is in a soft handoff, all the base stations involved in the soft handoff are involved in the forward link power control. When mobile terminal 126 receives fairly strong pilot signals from more than one base station, in this case from three base stations 112, 114, and 116, the mobile terminal is in soft handoff. This typically occurs when mobile terminal 126 is close to the edge of a cell. All three base stations 112, 114, and 116 transmit control information to mobile terminal 126 over respective forward control channels, and voice or data over respective forward traffic channels. In soft handoff, mobile terminal 126 transmits control information to all three base stations 112, 114, and 116 over respective reverse control channels, and it transmits voice or data to all three base stations 112, 114, and 116 over respective reverse traffic channels.

Base stations 112, 114, and 116 transmit forward traffic frames. Each forward traffic frame includes voice or data and error control information, typically in the form of a cyclical redundancy code (CRC). By contrast, each reverse traffic frame includes voice or data and error indicator bits (EIB) for indicating whether the last received forward traffic frame contained an error. Mobile terminal 126 receives the transmissions from all three base stations 112, 114, and 116 and combines the signals from all three to obtain the forward traffic frame. Mobile terminal 126 then checks the CRC of the combined signal to determine whether the forward traffic frame is in error. Mobile terminal 126 indicates this determination to all three base stations 112, 114, and 116 using the EIB in the next reverse traffic frame that mobile terminal 126 transmits. For example, a zero error indicator bit indicates that the forward traffic frame is not in error, and a positive error indicator bit indicates the forward traffic frame is in error. Upon receiving reverse traffic frames from the mobile terminal, the base stations sends the EIB to selection distribution unit (SDU) 128. SDU 128 examines all three EIBs, and determines whether the majority of the EIBs indicate an erred forward traffic frame. SDU 128 then indicates to all three base stations whether, and how, they should adjust the power of their forward links. For example, mobile terminal 126 can send an EIB indicating an erred forward traffic frame. Base station 112 and 116 can receive EIB that indicating that there is an error in the frame.

However, due to interference on the reverse traffic link between mobile terminal 126 and base station 114, base station 114 receives an EIB indicating that the frame is not erred. After receiving and examining all three EIBs, SDU 128 would determine that there is an erred frame and indicate to all three base stations to increase the power of their forward link. Typically, it takes about five frames for the base station to transmit the EIBs to the SDU, and for the SDU to perform the determination and notify the base stations.

Therefore, in a conventional CDMA wireless communications system during soft handoff, there is a five frame, i.e., 100 ms, delay between the reception of the current power control information and the power control decision based on the information. In CDMA 2000 wireless communications systems the speed of power control is 800 Hz. Each frame includes sixteen 1.25 ms time intervals, referred to herein as power control groups. Power control information, referred to herein as a power-control bit, is sent every 1.25 ms, or once every power control group. Therefore, during the 100 ms delay in the power control decision, each base station receives new power control information 80 times. By the time the SDU indicates to the base stations how to adjust the power on the forward link, the information on which the SDU based this decision has been updated so many times that it just as likely to be incorrect as to be correct. Making the decision on 100 ms-old information loses much of the benefit of providing power control information every 1.25 ms.

Eliminating the step of sending the power control information to the SDU and then back to the base stations by performing the power control decisions at the base station allows the power control information to be used before it is outdated. However, it presents another serious problem. As described above, the three base stations can receive different power control information due to interference and fading on the reverse link. Therefore, the power level of some base stations will go up and the power level of other base stations will go down, causing a divergence between the power levels on the forward link of these base stations. The mobile terminal receives the strongest signal form one of the base stations, referred to herein as the primary base station, and weaker signals from other base stations, referred to herein as the secondary base stations. To ensure that the primary base station sends the signal at a large enough power for the signal to be received without too many errors, the secondary base stations may produce too much power. When the secondary base stations produce too much power, their capacity is reduced, which reduces the capacity of CDMA system 100. This problem is further exacerbated when the base station with the strongest forward link is not the base station with the strongest reverse link.

FIGS. 1 and 2 illustrate this problem in more detail. FIG. 2 illustrates the power level of the traffic channel over time. At time T all three base stations 112, 114, and 116 are at a particular power level, P. Mobile terminal 126 transmits a power control bit to raise the power of the forward link. Base stations 112 and 116 receive a power control bit indicating that the base station should increase their power, therefore they increase the power level of the forward link by a step size. However, due to interference on the reverse traffic link between mobile terminal 126 and base station 114, base station 114 receives a power control bit indicating that it should decrease the power, therefore it decreases the power level of the forward link by a step size. Because base station 114 had the strongest forward link and it just reduced the power level of the forward link, mobile terminal 126 is still not getting the signal at a desired power. Mobile terminal 126 sends another power control bit requesting that the base stations increase the power on the forward link. If the reverse traffic link does not improve, base station 114 can again receive an incorrect power control bit while the other base stations receive the correct power control bit. This lowers the power level of the forward link from base station 114, and raises the power level of the forward links from base stations 112 and 116. Mobile terminal 126 again sends a power control bit requesting that the power on the forward link be increased.

When, at T+2.5, base station 114 finally receives the correct power control bit, it increases the power level 130 on its forward link. This is repeated until T+6.25, when mobile terminal 126 finally receives the signal at an acceptable power level. Base stations 112 and 116 also receive the power control bits to increase the power level, and also increase the power level 140 on their forward links. These two base stations 112 and 116 are now producing a great deal more power than necessary, which reduces the capacity of these two base stations and, therefore, reduces the capacity of CDMA system 100.

Accordingly, there exists a need for controlling power quickly while reducing the divergences between the power levels of the several base station in a soft handoff.

SUMMARY OF THE INVENTION

The invention solves the above problems by adjusting a base station's transmit power level a first amount if the base station is participating in a soft handoff and by a second amount if the base station is not participating in the soft handoff, i.e. in simplex mode. The first and second amounts are different.

In one embodiment of the invention, the adjustment is performed by using a down-step size that is larger in magnitude than an up-step size when the base station is in soft handoff. The transmit power level is increased by the smaller up-step size when the base station receives an indication to increase the transmit power level, and the transmit power level is reduced by the larger down-step size when there is an indication to decrease the transmit power level. If the base station is not in soft handoff, the transmit power level is adjusted by step sizes that are different than the step sizes used when in soft handoff. The step sizes used when in simplex mode are larger than the smaller up-step size and smaller than the larger down step size that are used when in soft handoff. Preferably, the step sizes used when in simplex mode for the up adjustment and for the down adjustment are equal.

In another embodiment, when the base station is in soft handoff, the adjustment is performed by adjusting the transmit power level by the same step sizes as used during simplex mode when the base station receives an indication to adjust the transmit power level and then reducing the result by a reduction amount. The order of these two steps can be reversed, and the transmit power level can be first reduced by the reduction amount and then adjusted by the same step sizes as used during simplex mode. The reduction amount has a magnitude greater than zero and smaller than the step size. In one embodiment of the invention, the reduction amount is weighted using the ratio of a forward-link pilot power level of the base station, as received by a mobile station in the soft handoff, and a sum of forward-link pilot power levels, as received by the mobile station, of all base station in the soft handoff. The transmit power level is then reduced by the weighted reduction amount.

In another alternative embodiment of the invention, the base station's transmit power level is adjusted by the first amount if the base station is participating in a soft handoff and if a reverse-link pilot power level being below an adjustment threshold. The base stations power level is adjusted by the second amount if the base station is not participating in the soft handoff or if the reverse-link pilot power level is above the adjustment threshold.

This method is preferably used with the method of programming each base station in a soft handoff with a threshold power level to constrain the power transmitted by the base station on the forward link. When the threshold power level is a minimum-threshold power level, each base station maintains its transmit power level at or above the minimum-threshold power level. When the threshold power level is a maximum-threshold power level, each base station maintains its transmit power level at or below the maximum-threshold power level.

The threshold power level can be an adjustable threshold power level or a fixed threshold power level. In the case where the threshold power level is fixed, each base station is programmed with the same fixed threshold power level, and each base station decides how to adjust its transmit power level locally based on the fixed threshold power level without input from other base stations.

In the case where the threshold power level is adjustable, the threshold power level is an adjustable threshold power level that is adjusted by a threshold step size when the transmit power level is substantially equal to the threshold power level for at least a predetermined percentage of a time period. For example, the threshold power level is adjusted by a threshold step size when the transmit power level is substantially equal to the threshold power level for at least 50% of the power control groups of a frame. Each base station participating in a soft handoff sends its power control information to a processor which adjusts the threshold power level and notifies each base station of the new adjusted threshold power level. In the meantime, each base station uses the threshold power level it currently has to locally adjust its transmit power level.

DETAILED DESCRIPTION

Figure 3:
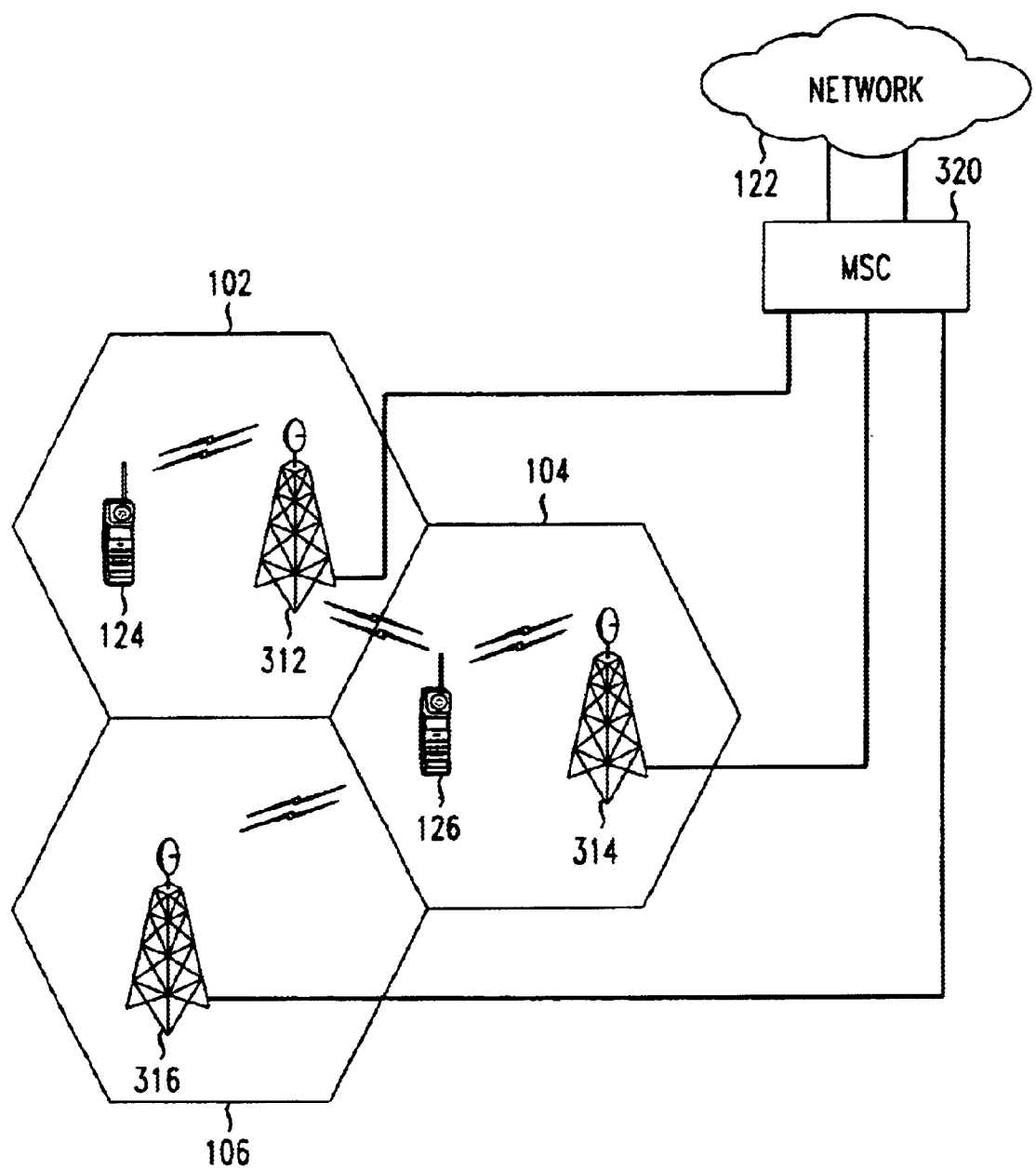
FIG. 3 is a block diagram of a portion of a wireless communication system where the forward-link power level is adjusted by a first amount if the base station is participating in a soft handoff and by a second amount, different from the first amount, if the base station is not participating in the soft handoff.

FIG. 3 illustrates CDMA system 300. Although the embodiment of the invention is being illustrated with the use of a CDMA system, the invention is not limited to use in CDMA systems. The invention may be equally applicable to any wireless communication system capable of soft handoff.

The geographic area serviced by CDMA system 300 is divided into cells 102, 104, and 106, each containing one base station 312, 314, and 316, respectively. Each base station 312, 314, and 316 includes equipment to communicate with Mobile Switching Center ("MSC") 320, which is connected to local and/or long-distance transmission network 122, such as a public switch telephone network (PSTN). Each base station 312, 314, and 316 also includes radios and antennas that the base station uses to communicate with mobile terminals 124, 126.

Base stations 112, 114, and 116 transmit forward traffic frames over the forward link. Mobile terminal 126 checks the signal-to-noise ratio on the forward link to determine whether the transmit power level of the forward link should be adjusted. The signal-to-noise ratio are often expressed as the ratio $E_b/N_0$, where $E_b$ is the energy per information bit and $N_0$ is the power spectral density of the interference seen by the receiver. Therefore, mobile terminal 126 checks the $E_b/N_0$ on the forward link to determine whether the transmit power level of the forward link should be adjusted. Mobile terminal 126 transmits a power control bit (PCB) requesting an adjustment of the transmit power level of forward link. For example, mobile terminal 126 transmits a power control bit indicating that the base stations should increase the transmit power level. The base stations receive the power control bit. Base station 312 and 316 receive a power control bit indicating that the base stations increase their transmit power level. However, due to fading and/or interference on the reverse traffic link between mobile terminal 126 and base station 314, base station 314 receives a power control bit indicating it should decrease its transmit power level.

Figure 4:
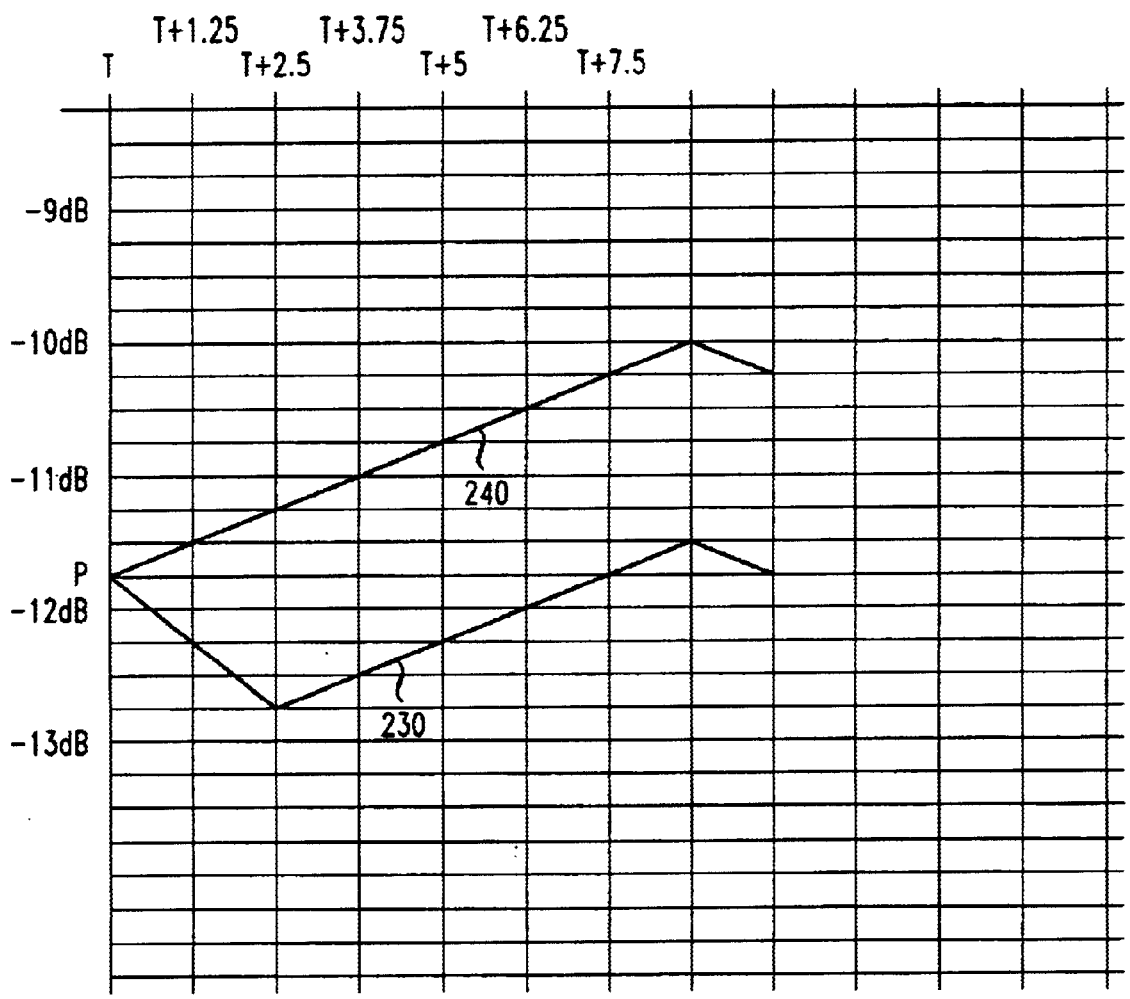
FIG. 4 is a graph illustrating the power level of a forward link traffic channel of the base stations in FIG. 3 over time.
Figure 5:
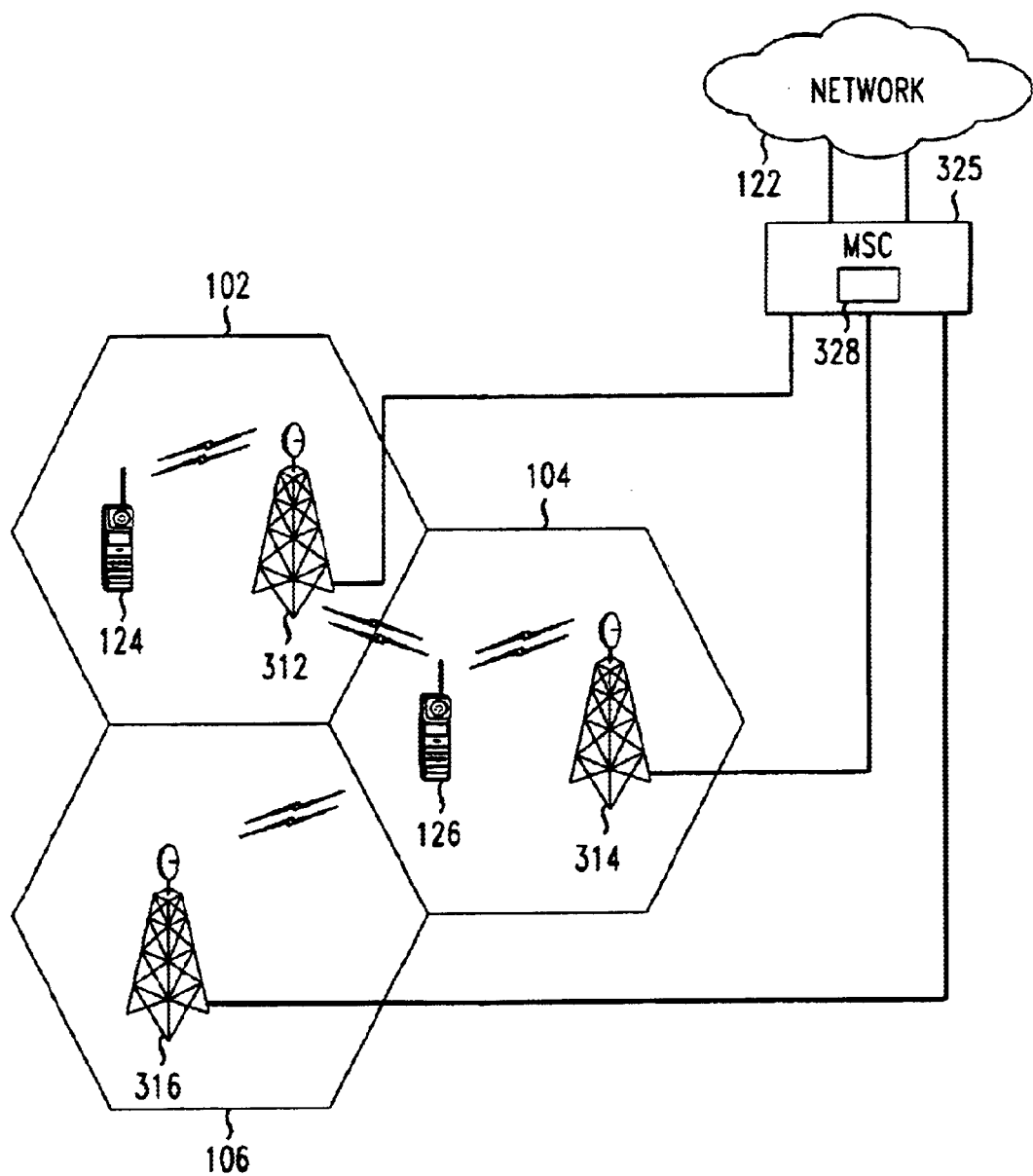
FIG. 5 is a block diagram of a portion of a wireless communication system in which the base stations have an adjustable threshold power level and the forward-link power level is adjusted by a first amount if the base station is participating in a soft handoff and by a second amount, different from the first amount, if the base station is not participating in the soft handoff.

As shown in FIG. 4, at time T, base station 314 adjusts its transmit power level 230 down by a down-step size. Base stations 312 and 316 adjust their transmit power level 240 up by an up-step size. Down-step size is larger in magnitude than the up-step size. The down-step size is larger the step size used to adjust the transmit power level when the base station is not in soft handoff. The up-step size is smaller the step size used to adjust the transmit power level when the base station is not in soft handoff. The magnitude of the difference between the step size and the up-step size, and between the step size the down-step size, is smaller than the step size. The up-step size and the down step size are preferably selected such that the capacity of the system increases. Optimal up and down step size can be obtained by performing a plurality of simulation in which the up and down step sizes are the only variable varied from simulation to simulation. The ones that produce the system having the highest capacity are the optimal step sizes. For example, the up-step size may be 0.4 dB and the down-step size may be 0.6 dB, when the step size is 0.5 dB. When the transmit power level is expressed linearly, instead of as dB, the step sizes are converted to step factors. The reduction amount is also converted from dB, and when converted would have a magnitude greater than one and smaller than the step factor.

After base stations 312, 314, and 316 adjust the power level on their forward links, they continue to transmit forward traffic frames over their forward links. Because base station 314 had the strongest forward link and reduced the transmit power level 230 of the forward link, mobile terminal 126 is still not getting the signal at a desired power. Mobile terminal 126 sends another power control bit requesting that the base stations increase the power on the forward link. Base stations 312 and 316 receive a power control bit indicating that the base station should increase their power, and following the steps described above, at time T+1.25, base stations 312 and 316 again increase the transmit power level of their forward link 240. If the reverse traffic link has not improved, base station 314 can again receive a power control bit indicating that it should decrease the power (i.e., base station 314 again receives the incorrect power control bit). Base station 314 follows the same steps described above to decrease its transmit power level.

Mobile terminal 126 again sends a power control bit requesting that the power on the forward link be increased. When base station 314 finally receives the correct power control bit, it increases the transmit power level 230 on its forward link using the steps described above for increasing the transmit power level, and mobile terminal 126 finally receives the signal at an acceptable power level. Base stations 312 and 316 also received the power control bit, and again adjust their transmit power level 410 as described above.

Figure 1:
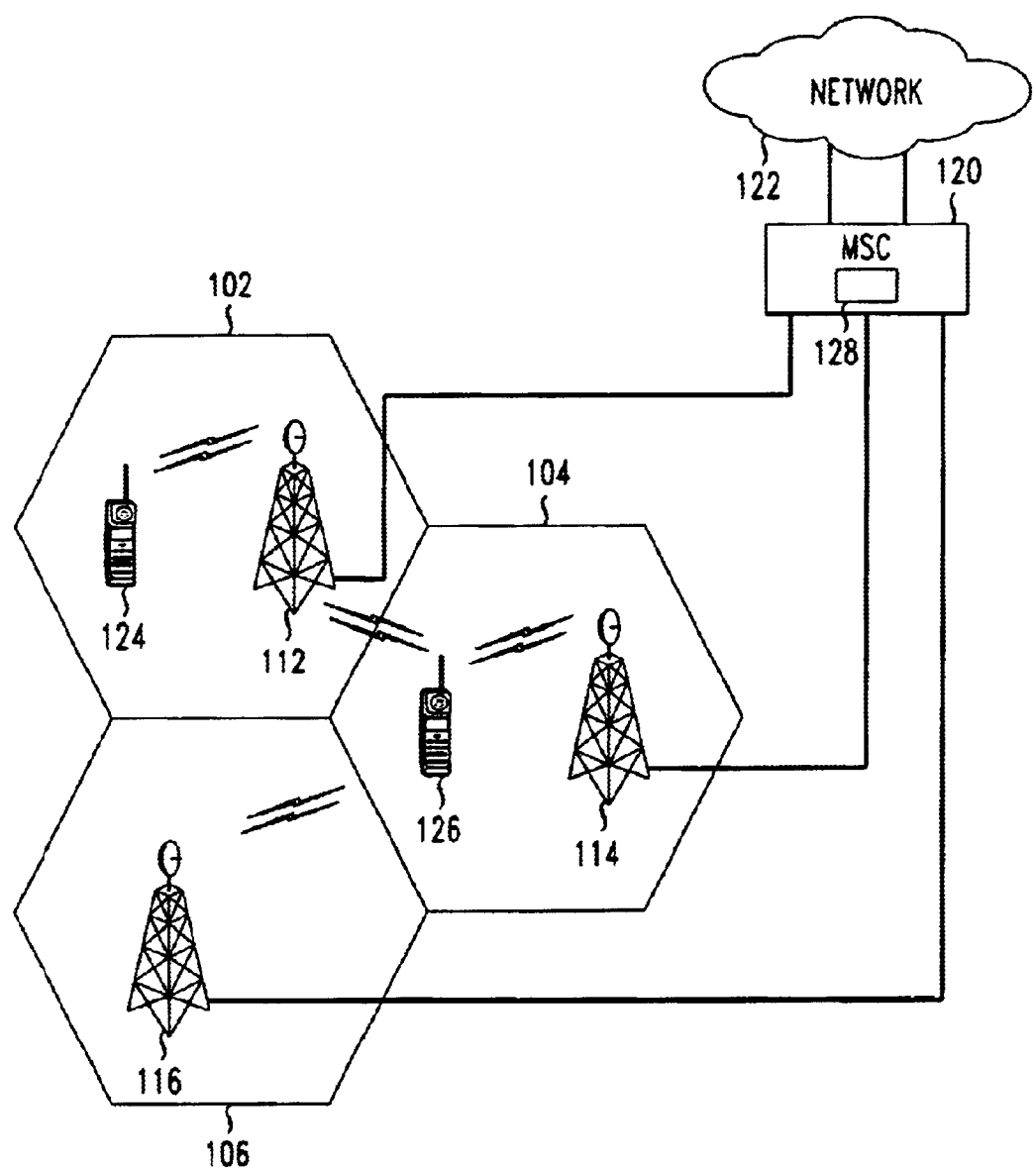
FIG. 1 is a block diagram of a portion of a wireless communication system.
Figure 2:
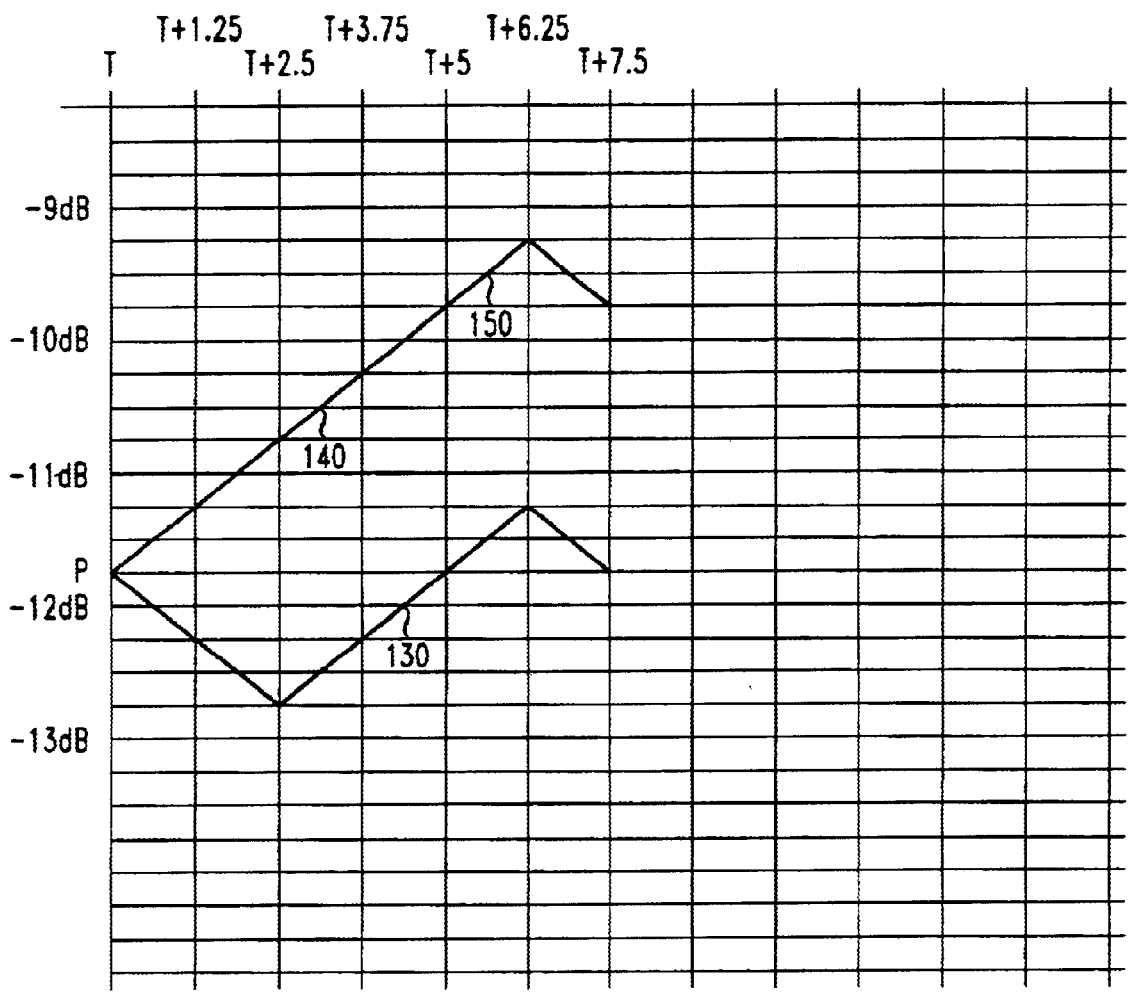
FIG. 2 is a graph illustrating the power level of a forward link traffic channel for the base stations in FIG. 1 over time.

As can be seen by comparing FIGS. 2 and 4, during soft handoff, for base stations that adjust their transmit power level when participating in soft handoff by a different amount than when not participating in soft handoff, the difference between the transmit power levels 230 and 240 is smaller than the difference between the transmit power levels 140 and 130 of the base stations that adjust the transmit power level by the same amount whether or not they are participating in a soft handoff. This prevents some of the base stations from transmitting at an excessive power level and, therefore, reduces the total power of the system.

The method of adjusting the base station transmit power level by different amounts based on whether the base station participating in a soft handoff can be used with other methods for controlling power quickly while reducing the divergences between the power levels of the several base station in a soft handoff.

This method is preferably used with the method of programming each base station in a soft handoff with a threshold power level to constrain the power transmitted by the base station on the forward link. Each base station is programmed with a threshold power level to control the power transmitted by the base station on the forward link. Preferably, all power levels are expressed in decibels (dB) relative to the pilot's power level. The threshold power level can be adjustable or fixed.

In the case where the threshold power level is fixed, each base station is programmed with the fixed threshold power level and each base station decides how to adjust its transmit power level locally based on the fixed threshold power level without input from other base stations. Each base station in a soft handoff should use the same value for the fixed threshold power level when communicating with the mobile station in the soft handoff. This fixed threshold power level can be determined by the primary base station and provided to the secondary base stations at the start of the soft handoff, or the fixed threshold power level can be determined at a central location, such as the MSC, and provided to all of the base stations in the soft handoff. The base stations in another soft handoff can use either this same value or another value for the fixed threshold power level when communicating with the mobile station in the other soft handoff.

In the case where the threshold power level is adjustable, the threshold power level is adjustable. Each base station participating in a soft handoff sends its power control information to a processor, such as the selection distribution unit. The processor adjusts the threshold power level and notifies each base station of the new adjusted threshold power level. In the meantime, each base station uses its current threshold power level to locally constrain its transmit power level.

Additionally, in each of the above-described cases, the threshold power level can be either a minimum or a maximum-threshold power level. The threshold power level can be either a minimum or a maximum-threshold power level. Alternatively, each base station can have both a minimum-threshold power level and a maximum-threshold power level.

Figure 6:
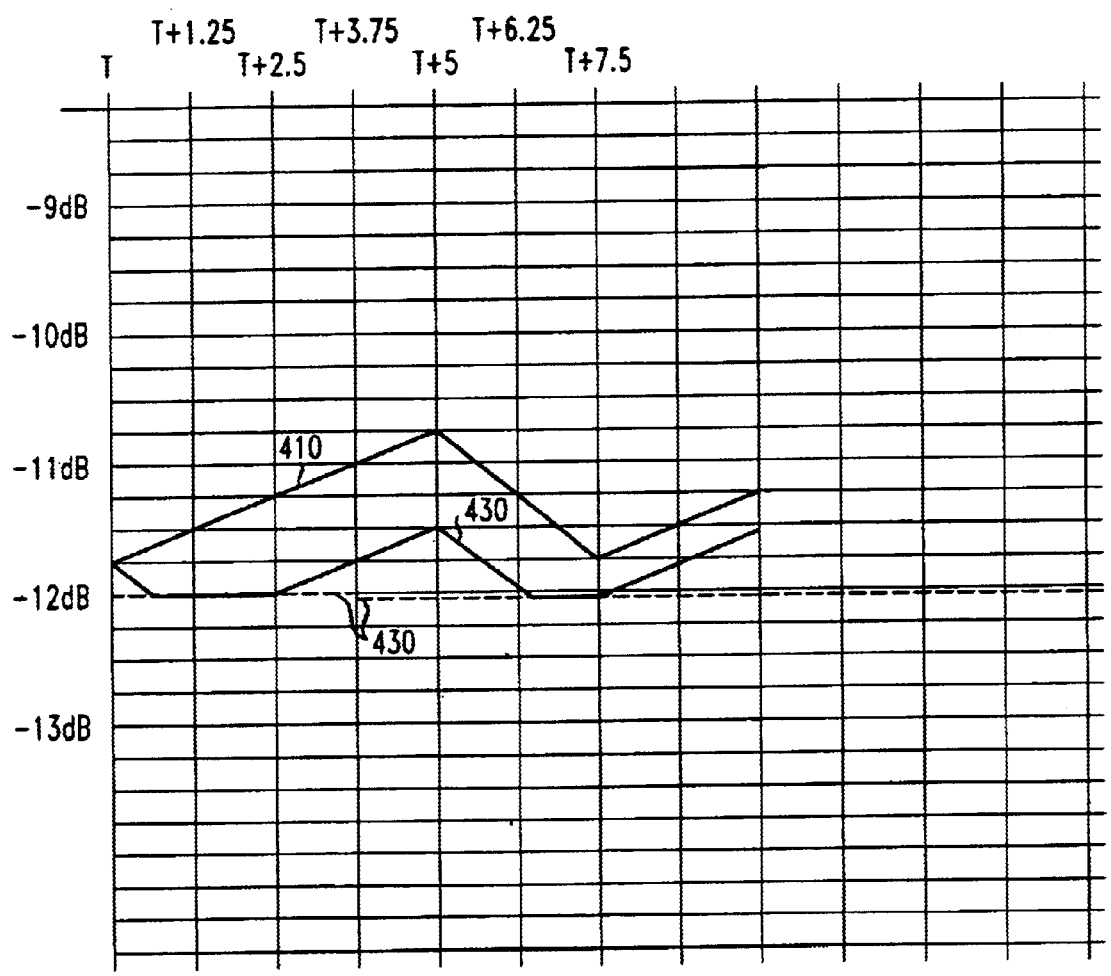
FIG. 6 is a graph illustrating the power level of a forward link traffic channel of the base stations in FIG. 5 over time.

FIGS. 5, 6, 7A and 7B illustrate the case where the threshold power level is a minimum-threshold power level that is adjusted by processor 328. Mobile terminal 126 transmits a power control bit (PCB) requesting an adjustment of the transmit power level of forward link. For example, mobile terminal 126 transmits a power control bit requesting that the base stations increase the transmit power level. In step 500, the base stations receive the power control bit. Base station 312 and 316 receive a power control bit indicating that the base stations should increase their transmit power level. However, due to fading and/or interference on the reverse traffic link between mobile terminal 126 and base station 314, base station 314 receives a power control bit indicating that it should decrease its transmit power level. In step 510, each of the base stations 312, 314, and 316 check if the received power control bit instructed it to adjust its transmit power level toward the minimum-threshold power level. In this case, each base station checks if the power control bit instructed the base station to adjust its transmit power level down. For base stations 312 and 316, the answer in step 510 is no. As shown in FIG. 6, at time T, these two base stations proceed to step 520, where they adjust their transmit power level 410 up by the up-step size. Then, in step 552, base stations 312 and 316 indicate their transmit power level to processor 328. Processor 328 adjusts the minimum-threshold power level once every frame as described below. Therefore, 25 unless the processor determines that value of the minimum-threshold power level should remain the same, each base station receives the adjusted minimum-threshold power level from processor 328 once per frame. Typically, the base station receives the adjusted minimum-threshold power level from processor 328 at the same time within each frame. In step 555, each base station checks if it is the time at which it receives the adjusted minimum power level from the processor. If the answer is no, then the base station returns to step 500 and awaits the next power control bit. If the answer in step 555 is yes, then, in step 560, each base station receives the adjusted minimum-threshold power level 420 from processor 328 and changes its minimum-threshold, power level to the adjusted threshold power level. The base station then returns to step 500 and awaits the next power control bit.

For base station 314, the answer in step 510 is yes, and it proceeds to step 530, where base station 314 checks if its transmit power level 430 is within one step size from the minimum-threshold power level 420. If the answer in step 530 is no, in step 540, the base station would adjust its transmit power level down by one step size, indicate its transmit power level to processor 328 in step 552, check whether it is time to receive the adjusted minimum power level from the processor, and return to step 500. If the answer in step 530 is yes, as it is in this case, base station 314 proceeds to step 550 and adjusts its transmit power level 430 to be equal to the minimum-threshold power level 420. In step 552, base station 314 indicates its transmit power level 430 to processor 328, and in step 555, the base station checks if it is time to receive the adjusted minimum power level from the processor. If the answer is no, then the base station returns to step 500 and awaits the next power control bits. If the answer in step 555 is yes, then, in step 560, the base station receives the adjusted minimum-threshold power level 420 from processor 328 and changes its minimum-threshold power level to the adjusted threshold power level. The base station then returns to step 500 and awaits the next power control bit.

Because base station 314 had the strongest forward link and reduced the transmit power level 430 of the forward link, mobile terminal 126 is still not getting the signal at a desired power. Mobile terminal 126 sends another power control bit requesting that the base stations increase the power on the forward link. At step 500, base stations 312 and 316 receive a power control bit indicating that the base station should increase their power, and following the steps described above, at time T+1.25, base stations 312 and 316 again increase the transmit power level of their forward link 410 by a step size. If the reverse traffic link has not improved, base station 314 can again receive a power control bit indicating that it should decrease the power (i.e., base station 314 again receives the incorrect power control bit). Base station 314 follows the same steps described above. As can be seen in FIG. 6, when base station 314 reaches step 550 at time T+1.25, its transmit power level 430 is already at the minimum-threshold power level 420. Therefore, base station's 314 transmit power level 430 remains at the minimum-threshold power level 420.

Mobile terminal 126 again sends a power control bit requesting that the power on the forward link be increased. When base station 314 finally receives the correct power control bit, it increases the transmit power level 430 on its forward link, and mobile terminal 126 finally receives the signal at an acceptable power level. Base stations 312 and 316 also received the power control bit, and also increase the transmit power level 410 on their forward links.

As can be seen by comparing FIGS. 2 and 6, during soft handoff, the difference between the transmit power levels 410 and 430 of the base stations having the minimum-threshold power level is significantly smaller than the difference between the transmit power levels 140 and 130 of the base stations not having it. This prevents some of the base stations from transmitting at an excessive power level and, therefore, reduces the total power of the system.

As mentioned above in step 552, base stations 312, 314, and 316 indicate their transmit power levels to processor 328. As shown in FIGS. 3, 6, and 5B, in step 565, once every power control group, processor 328 receives an indication from each of the base stations 312, 314, and 316 in the soft handoff whether the base station's transmit power level is equal to the minimum-threshold power level. Alternatively, each base station can keep a counter of the number of times it is at the minimum-threshold power level during a frame, and it can transmit the count to processor 328 once per frame. In step 570, processor 328 checks if it received all the indications from each of the base stations for the time period, which is preferably one frame. For example, since each base station sends one indication to processor 328 every power control group, with 16 power control groups per frame, processor 328 receives 48 indications per frame. If it has not received all indications, processor 328 returns to step 565 and awaits the next set of indications.

If it has received all the indications, then, in step 575, processor 328 checks whether during the frame all of the base stations had a transmit power level equal to the minimum-threshold power level for a predetermined percentage of the power control groups. For example, the predetermined percentage can be 50%, which is 24 power control groups for the 48 indications. Therefore, in step 575, processor 328 checks if for at least 24 power control groups of this frame the transmit power levels were equal to the minimum-threshold power level. If the transmit power level was equal to the minimum-threshold power level for 24 or more power control groups, then the processor would reduce the minimum-threshold power. level, subject to any minimums on the minimum-threshold power. If the transmit power level was equal to the minimum-threshold power level for fewer than 24 power control groups, then processor 328 would raise the minimum-threshold power level, subject to any maximums on the minimum-threshold power.

The predetermined percentage should be selected to be the percentage that reduces the total transmitted power by the largest amount. The predetermined percentage can be obtained by performing a plurality of simulations or an empirical study to obtain the total power of the forward links to a mobile terminal in a soft handoff from all the base stations in the soft handoff. The base stations in the simulation are programmed with a minimum-threshold power level. Each simulation should be set up with the base stations at full load, i.e., at full capacity, with a certain speed at which the mobile terminal is moving, with a certain signal-to-noise ratio between the base stations and the mobile terminal. The signal-to-noise ratio can be expressed as $$\frac{\hat{I}_{or}}{I_{oc} + N_o},$$

where $\hat{I}_{or}$ is the power level per unit of bandwidth at the mobile station, i.e. the sum of the power levels of all the signals from the base stations in the soft handoff with the mobile terminal, measured at the mobile terminal. $I_{oc}$ is the sum of the power levels of all the signals from the base stations in wireless communication system that are not in soft handoff with the mobile terminal, measured at the mobile terminal. $N_o$ is the thermal noise of the receiver of the mobile terminal.

In each simulation a particular percentage is set equal to the percentage of power control groups at which the processor adjusts the minimum-threshold power level. The simulation should obtain the total transmitted power for a significant enough length of time to ensure that the frame error rate on the forward link is acceptable. For example, when the desired frame error rate is 1% and significant enough length of time is about 10,000 frames. This total power is then averaged over the length of time, thus obtaining the average transmit power of the simulation.

The simulations should be repeated keeping all but one of the above factors the same, and varying one of the factors. The signal-to-noise ratio should be varied. For example, several simulations, such as 3, can be performed, each having a different signal-to-noise ratio, such as 2 dB, 5 dB, and 8 dB. The rest of the factors are kept constant, so all the base stations are at full capacity, the mobile terminal is moving at a certain constant speed, and the percentage is set to a constant percentage. Then, the speed at which the mobile terminal is moving is changed and the 3 simulation with different signal-to-noise ratios are repeated. The speed can be changed once or twice producing a total of 6 or 9 simulations. When two sets simulations are run using two speeds, the speeds 3 km/hr and 100 km/hr can used. When three sets of simulations are run 33 km/hr can be added as the third speed. The number of base stations in the soft handoff can also be changed, typically the simulations are run with either two or three base stations. The simulations with different signal-to-noise ratios and different speeds of the mobile should be repeated for the number of base stations being two and the number of base stations being three. The percentage of power control groups at which the processor adjusts the minimum-threshold power level is kept constant through these simulations. The average transmit power obtained in each simulation is averaged over all the simulation for the percentage. This averaged power is the power associated with the percentage.

The percentage is then changed and the same simulations are performed for another percentage. The simulations can be performed for another 2, 3 or many percentages depending on the amount of processor time available to run the simulations. The power associated with the percentages are then compared to each other and the lowest power is determined. The percentage associated with the lowest power is the optimum percentage and it should be selected as predetermined percentage of power control groups at which the processor adjusts the minimum-threshold power level. Typically, this percentage can be between 10% and 70% of the power control groups, such as 50%, although this percentage can be any percentage between 0% and 100%.

In addition to measuring the total transmitted power each simulation also measures the value of the minimum-threshold power level throughout the simulation. This value is averaged over the number of frames in the simulations, and then averaged over the number of simulations to obtain an averaged minimum-threshold power level that is associated with each percentage. The averaged minimum-threshold power level associated with the optimum percentage should be the initial value of the minimum-threshold power level in base stations 312, 314, and 316. Typically, this value will be between about 8 dB and 10 dB below the power level of the pilot.

Returning to step 575, when the answer in step 575 is no, processor 328 proceeds to step 577, where it checks if the minimum-threshold power level is equal to the highest power level that the minimum-threshold power level is allowed to equal. This highest power level is the power level needed for a signal when the base station is at full load and the path loss between the base station and the mobile terminal is at its highest. The highest power level can be obtained either from simulation or an empirical study. Typically, the highest power level can be between 0 dB and 11 dB below the pilot's power level. For example, in a CDMA 2000 1X system having a data rate of 9600, the highest power level can be 0 dB below the pilot's power level.

If the answer in step 577 is no, in step 578, processor 328 determines the threshold step size. Preferably, the threshold step size varies in size based the number of times the transmit power levels from all of the base stations are equal to the minimum-threshold power level. This allows the threshold step size to be more if the transmit power level. Alternatively, the threshold step size can be a fixed step size.

Equation 1 illustrates one method of obtaining a threshold step size that varies in size based on the number of times the transmit power levels from all of the base stations are equal to the minimum-threshold power level. $E_u$ is the number of times that the relevant base stations' transmit power levels are not equal to the minimum-threshold power level. N is the number of power control groups in the frame. $A_N$ is the number of base stations in the soft handoff. $F_d$ is the predefined fraction of power control groups having transmit power levels equal to the minimum-threshold power level that trigger an adjustment in the minimum power level. $\Delta_d$ is the largest possible threshold step size per frame, expressed in dB.

$$\text{threshold step size} = \frac{E_u - N * A_N * (1 - F_d)}{1 - F_d} * \frac{\Delta_d}{N} \quad (1)$$

For example, if there are 3 base stations in the soft handoff, the predefined percentage is 50%, the number of times that the relevant base stations' transmit power levels are not equal to the minimum-threshold power level is 20, and the largest possible down step size per frame is 0.5, then using equation 1, the threshold step size equals $$\frac{20 - 16 * 3 * (1 - .5)}{1 - .5} * \frac{.5}{16} = 2 * (20 - 24) * .03125 = -.25 \text{ dB}.$$

After determining the threshold step size, then, in step 580, processor 328 increases the minimum-threshold power level by the smaller of either the threshold step size or a value that would make the minimum-threshold power level equal to its allowed highest power level. Processor 328 proceeds to step 595 and transmits the adjusted threshold power level to the base stations. Processor 328 then returns to step 565 to await the next transmit power levels. If the answer in step 577 is yes, the processor does not adjust the minimum-threshold power level and returns to step 565 to await the next transmit power levels.

When the answer in step 575 is yes, in step 585, processor 328 checks if the minimum-threshold power level is equal to the lowest power level that the minimum-threshold power level is allowed to equal. This lowest power level is the power level needed for a call when the base station is at full load and the path loss between the base station and the mobile terminal is at its lowest. The lowest power level can be obtained either from simulation or an empirical study. Typically, the lowest power level can be between 8 dB and 20 dB below the pilot's power level. For example, in a CDMA 2000 1X system having a data rate of 9600 and a chip rate of 1.2288 M chips/sec, the highest power level can be 20 dB below the pilot's power level.

If the answer in step 585 is no, in step 587, processor 328 determines the threshold step size using equation 1 as described above. For example, if there are 3 base stations in the soft handoff, the predefined percentage is 50%, the number of times that the relevant base stations' transmit power levels are not equal to the minimum-threshold power level is 30, and the largest possible down step size per frame is 0.5, then using equation 1, the threshold step size equals $$\frac{30-16*3*(1-.5)}{1-.5} * \frac{.5}{16} = 2*(30-24)*.03125 = .375 \text{ dB}.$$

After determining the threshold step size, then, in step 590, processor 328 decreases the minimum-threshold power level by the smaller of either the threshold step size or a value that would make the minimum-threshold power equal to its allowed lowest power level. Processor 328 proceeds to step 595 and transmits the adjusted threshold power level to the base stations. Processor 328 then returns to step 565 to await the next transmit power levels. If the answer in step 585 is yes, the processor does not adjust the minimum-threshold power level and returns to step 565 to await the next transmit power levels.

Optionally, when the minimum-threshold power level is equal to either the highest or the lowest power level that it is allowed to be in steps 577 and 585, respectively, the processor can go to step 595 to transmit the minimum-threshold power level although. Processor 328 then returns to step 565 to await the next transmit power levels.

Figure 7A:
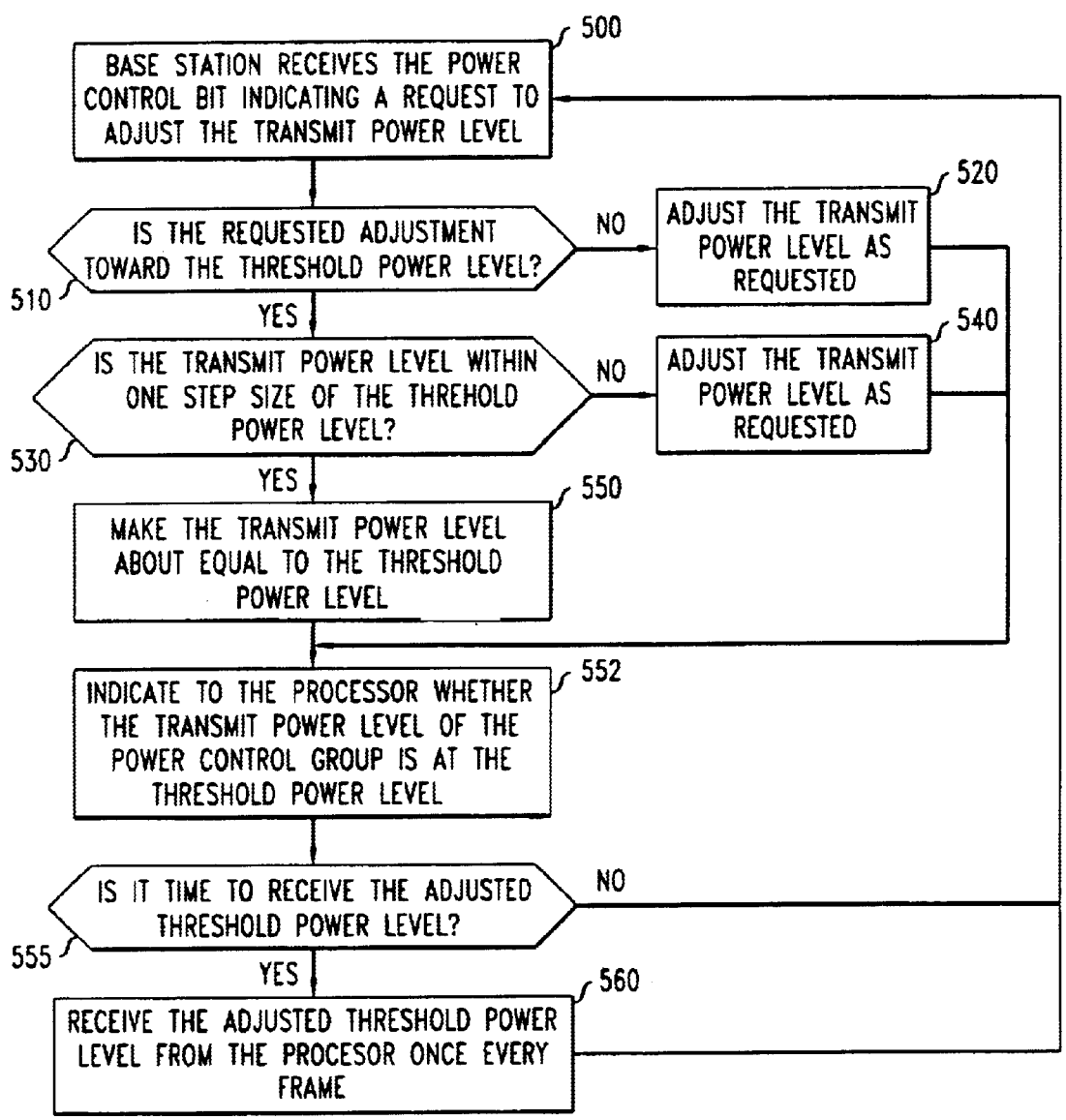
FIGS. 7A and 7B are flowcharts illustrating the method of controlling the transmit power level of a base station when the base station has a threshold power level.
Figure 7B:
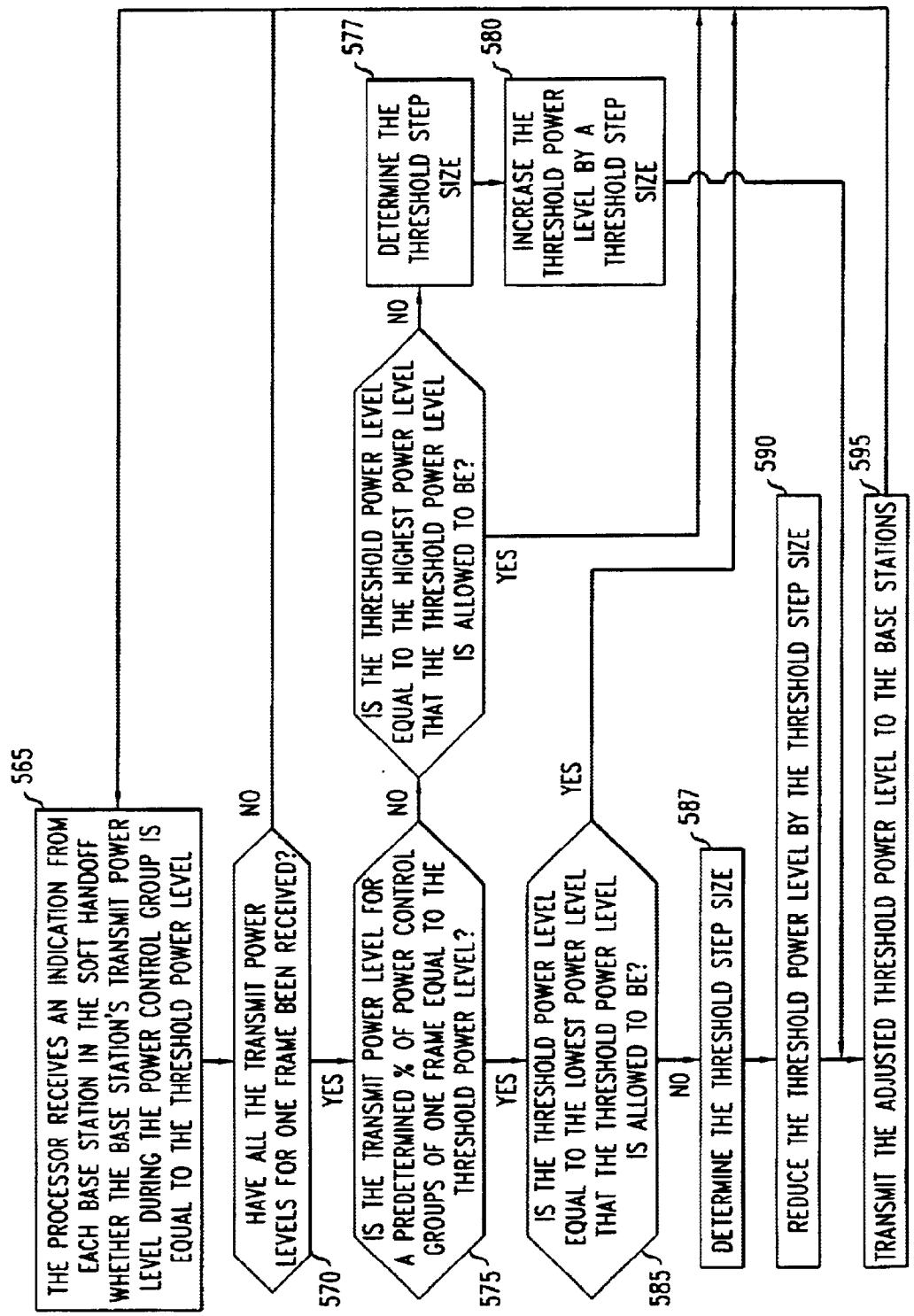
Figure 8:
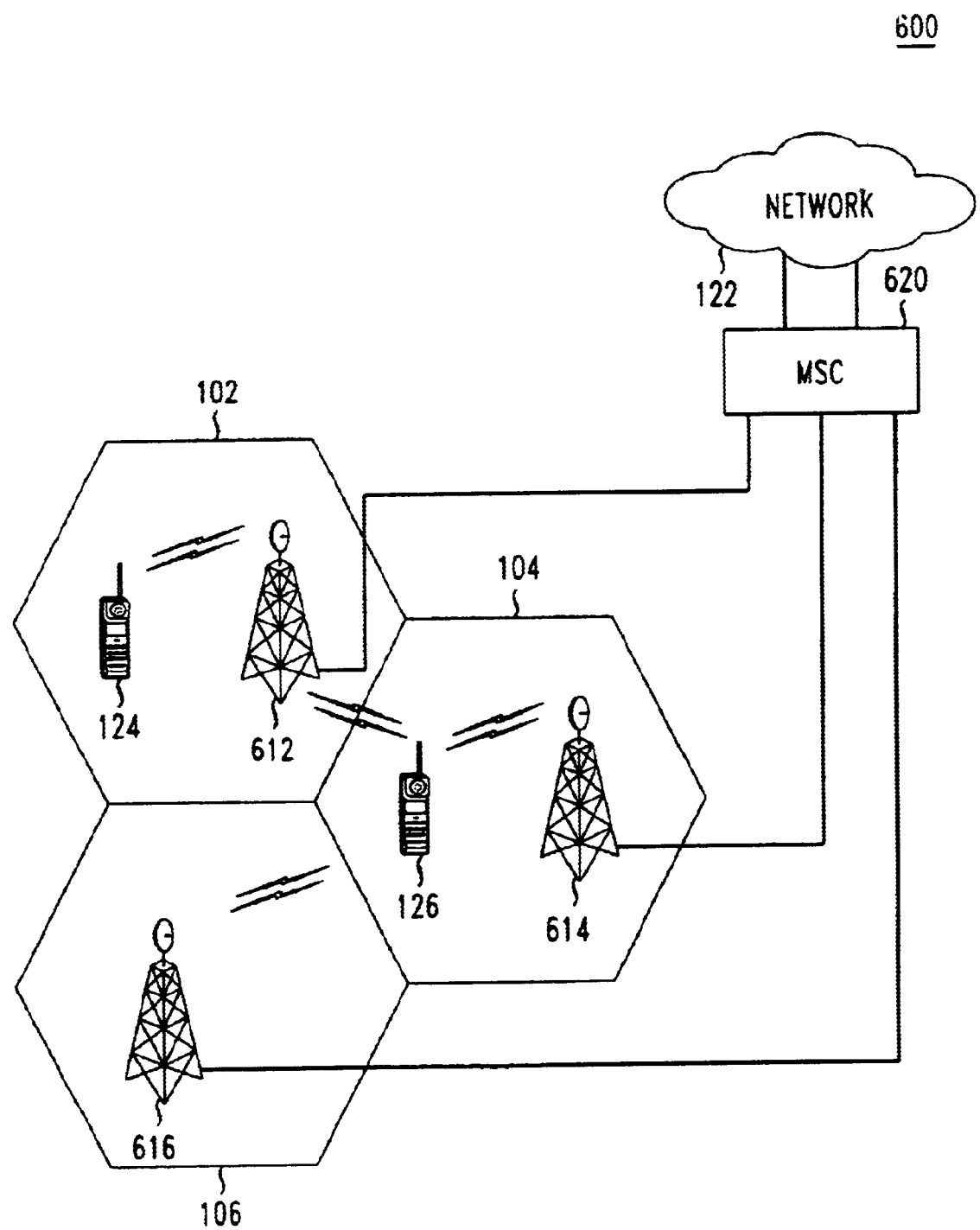
FIG. 8 is a block diagram of a portion of a wireless communication system in which the base stations have a fixed threshold power level and the forward-link power level is adjusted by a first amount if the base station is participating in a soft handoff and by a second amount, different from the first amount, if the base station is not participating in the soft handoff.

Referring to FIGS. 8 and 7A the case is now described where the threshold power level is fixed, each base station is programmed with the fixed threshold power level, and each base station decides on how to adjust its transmit power level locally. In this case, the base stations follow a portion of the method described above for the case for a minimum-threshold power level adjusted by the processor. The applicable portion includes the steps performed by the base station that do not include the processor, i.e., steps 500 through 550.

In step 500, the base stations receive the power control bit. In step 510, each of the base stations 612, 614, and 616 checks if the received power control bit instructed it to adjust its transmit power level toward the minimum-threshold power level. In this case, each base station checks if the power control bit instructed the base station to lower its transmit power level. If for a particular base station the answer in step 510 is no, the base station proceeds to step 520, where it adjusts its transmit power level up by the adjusted up-step size. The base station then returns to step 500 and awaits the next power control bit. If the answer in step 510 is yes, the base station proceeds to step 530, where the base station checks if its transmit power level is within one step size from the minimum-threshold power level. If the answer in step 530 is no, in step 540, the base station adjusts its transmit power level down by one step size, and return to step 500 to await the next power control bit. If the answer in step 530 is yes, the base station proceeds to step 550 and adjusts its transmit power level to be equal to the minimum-threshold power level. The base station then returns to step 500 and awaits the next power control bits.

Similarly to the methods described above, the fixed minimum-threshold power level keeps the differences between the transmit power levels of the base stations in a soft handoff smaller than the differences between the transmit power levels of the base stations not having the fixed minimum-threshold power level. This prevents some of the base stations from transmitting at an excessive power level and, therefore, reduces the total power of the system.

The fixed minimum-threshold power level should be selected to be the minimum-threshold power level that reduces the total transmitted power by the greatest amount. Typically, this value will be between about 8 dB and 10 dB below the power level of the pilot.

The fixed minimum-threshold power level can be obtained by performing the simulations or an empirical study described above for the case having a minimum-threshold power level adjusted by the processor. The averaged minimum-threshold power level associated with the optimum percentage should be the fixed minimum-threshold power level of the base stations.

Each base station in a soft handoff should use the same value for the fixed threshold power level when communicating with the mobile station in the soft handoff. This fixed threshold power level can be determined by the primary base station and provided to the secondary base stations at the start of the soft handoff, or the fixed threshold power level can be determined at a central location, such as MSC 620, and provided to all of the base stations in the soft handoff. The base stations in another soft handoff can use either this same value or another value for the fixed threshold power level when communicating with the mobile station in the other soft handoff.

Although, the above illustrative embodiments have been described for the minimum-threshold power levels, all of these embodiments can include either a maximum power level, or both a minimum and maximum-threshold power level. Similarly to the minimum-threshold power levels, the maximum-threshold power levels are selected to obtain the lowest total power. The maximum-threshold power levels can be selected in a manner similar to the minimum-threshold power level. However, care should be taken to ensure that adding a maximum-threshold power level does not lead to an unacceptable number of errors in the transmitted signal. For example, the cases where the maximum-threshold power levels are adjustable, the maximum-threshold power levels should be adjusted when the percentage of power control groups having a power level equal to the maximum-threshold power level is about 1% to 5% of the power control groups from all the base station in the soft handoff during the frame.

The foregoing is merely illustrative. Thus, for example, in the illustrative embodiment the down step size is larger than the up step size. In an alternative embodiment of the invention, if the base station is in soft handoff, the transmit power level is adjusted by the same step size to form an adjusted transmit power level, if the base station received an indication to adjust the transmit power level. The adjusted transmit power level is reduced level by a reduction amount. The reduction amount has a magnitude greater than zero and smaller than the step size. The reduction amount is preferably selected such that the capacity of the system increases. An optimal reduction amount can be obtained by performing a plurality of simulation in which the reduction amount is the only variable varied from simulation to simulation. The reduction amount that produce the system having the highest capacity is the optimal reduction amount. For example, the reduction amount may be 0.1 dB. When the transmit power level is expressed linearly, instead of as dB, the reduction amount is converted to a factor.

In one embodiment of the invention, the reduction amount is weighed using the ratio of a forward-link pilot power level of the base station, as received by a mobile station in the soft handoff, and a sum of forward-link pilot power levels, as received by the mobile station, of all base station in the soft handoff. The transmit power level is then reduced by the weighted reduction amount.

Furthermore, in the illustrative embodiments the base station's transmit power level is adjusted by the first amount if the base station is participating in a soft handoff, and by the second amount if the base station is not participating in the soft handoff. In another alternative embodiment of the invention, the base station's transmit power level is adjusted by the first amount if the base station is participating in a soft handoff and if a reverse-link pilot power level being below an adjustment threshold. The base stations power level is adjusted by the second amount if the base station is not participating in the soft handoff or if the reverse-link pilot power level is above the adjustment threshold. The adjustment threshold is preferably based on the signal-to-noise ratio of the forward link, although the adjustment threshold can also be based on the signal-to-noise ration of the reverse link. The signal-to-noise ratio can be expressed as $E_c/I_0$, where $E_c$ is the energy per chip of the pilot and the $I_0$ is the total received signal spectral density, $E_b/N_0$, or $$\frac{\hat{I}_{or}}{I_{oc} + N_o}.$$

The adjustment threshold is selected such that when the adjustment threshold is used to adjust the step size the capacity of the system increases. An optimal adjustment threshold can be obtained by performing a plurality of simulation in which the adjustment threshold is the only variable varied from simulation to simulation. The adjustment threshold that produces the system having the highest capacity is the optimal adjustment threshold. Typically, when the adjustment threshold is expressed in terms of the $E_c/I_0$, it can be approximately 9 dB below the sum of the pilots' $E_c/I_0$, or it can be approximately 6 dB below the $E_c/I_0$ of the best pilot. Additionally, when the base stations pilot's power level is no longer measurable, the base station's power level can be considered by be below the adjustment threshold.

Additionally, in another alternative embodiment of the invention, the adjustment factor is weighed based on the ratio of a forward-link pilot power level of the base station, as received by a mobile station in the soft handoff, and a sum of forward-link pilot power levels, as received by the mobile station, of all base station in the soft handoff. The base station receives forward-link pilot power levels, as these forward-link pilot power levels are received by the mobile station, for all of the base stations in the soft handoff. The base station receives these forward-link pilot power level in a pilot strength measurement message. The step size is then adjusted by the weighted adjustment factor.

Additionally, although in the illustrative embodiment the time period is one frame and the time interval is one power control group, any time period having at least one time interval can be used, and any time interval can be used during which a power level measurement of the forward link can be taken. For example, the time period can be several frames, or one or several power control groups, which are 1.25 ms time intervals for which power measurements of the forward link can be taken. The time interval can be several power control groups, or one or several frames.

Furthermore, although in the illustrative embodiment the processor is located in a central location, such as the MSC, the processor can be located at one of the base stations. Alternatively, the processing function can be distributed among the MSC and several base stations, or distributed just among several base stations.

While the invention has been described with reference to a preferred embodiment, it will be understood by those skilled in the art having reference to the specification and drawings that various modifications and alternatives are possible therein without departing from the spirit and scope of the invention.

We claim:

1. A method for controlling a transmit power level of a signal from a base station to a mobile terminal in a wireless system, the method comprising the steps of:
    determining whether the base station is participating in a soft handoff;
    adjusting the transmit power level by a first amount if the base station is participating in the soft handoff, the first amount being less than the entire transmit power level of the signal, the adjusting step comprising the steps of:
        adjusting the transmit power level by an up-step size if there is an indication to increase the transmit power level; and
        adjusting the transmit power level by a down-step size if there is an indication to decrease the transmit power level, the down-step size being larger in magnitude than the up-step size; and
    adjusting the transmit power level by a second amount if the base station is not participating in the soft handoff, the second amount not being equal to the first amount;
    wherein:
        the step size used to adjust the transmit power level up when the base station is not participating in a soft handoff is larger than the up-step size; and
        the step size used to adjust the transmit power level down when the base station is not participating in a soft handoff is smaller than the down step size.

2. The method of claim 1, wherein the step size used to adjust the transmit power level up when the base station is not participating in a soft handoff is equal to the step size used to adjust the transmit power level down when the base station is not participating in a soft handoff.

3. The method of claim 1, wherein:
    the magnitude of a difference between the step size used to adjust the transmit power level up when the base station is not participating in a soft handoff and the up-step size is smaller than the step size; and
    the magnitude of a difference between the step size used to adjust the transmit power level down when the base station is not participating in a soft handoff and the down-step size is smaller than the step size.

4. A method for controlling a transmit power level of a base station in a wireless system, the method comprising the steps of:
    determining whether the base station is participating in a soft handoff;
    adjusting the transmit power level by a first amount if the base station is participating in the soft handoff;
    the step of adjusting the transmit power level by the first amount if the base station is participating in the soft handoff comprises the steps of:
        adjusting the transmit power level by a step size if there is an indication to adjust the transmit power level; and
        reducing the transmit power level by a reduction amount; and
    adjusting the transmit power level by a second amount if the base station is not participating in the soft handoff, the second amount not being equal to the first amount.

5. The method of claim 4, wherein the step of adjusting the transmit power level by the second amount if the base station is not participating in the soft handoff comprises the step of adjusting the transmit power level by the step size if an indication to adjust the transmit power level.

6. The method of claim 4, wherein the reduction amount has a magnitude greater than zero and smaller than the step size.

7. The method of claim 4, wherein the reduction amount comprises 20%.

8. The method of claim 4, wherein the reduction amount comprises 1 dB.

9. The method of claim 4, wherein the reducing step comprises the steps of:
  weighting the reduction amount based on a ratio of a forward-link pilot power level of the base station and a sum of forward-link pilot power levels, as received by the mobile station, of all base station in the soft handoff, to form a weighted reduction amount; and
  reducing the transmit power level by the weighted reduction amount.

10. The method of claim 9, wherein the base station receives forward-link pilot power levels of base stations in the soft handoff, as received by the mobile station, in a pilot strength measurement message.

11. A method for controlling a transmit power level of a base station in a wireless system, the method comprising the steps of:
  determining whether the base station is participating in a soft handoff;
  adjusting the transmit power level by a first amount if the base station is participating in the soft handoff and if the transmit power level of the base station is not equal to a threshold power level;
  adjusting the transmit power level by a second amount if the base station is not participating in the soft handoff and if the transmit power level of the base station is not equal to a threshold power level, the second amount not being equal to the first amount;
  receiving power control information for a time interval; and
  adjusting the threshold power level by a threshold step size if the transmit power levels being substantially equal to the threshold power level for at least a predetermined percentage of a time period.

12. A method of claim 11, wherein:
  the threshold power level is a minimum-threshold power level;
  the predetermined percentage is between about 10% and about 70%; and
  the step of adjusting the threshold power level comprises adjusting the minimum-threshold power level down by a threshold step size.

13. The method of claim 12, further comprising the step of adjusting a maximum-threshold power level up by a threshold step size if the transmit power level being equal to a maximum-threshold power level for at least between about 1% and about 5% of the time intervals.

14. The method of claim 11, wherein:
  the threshold power level is a maximum-threshold power level;
  the predetermined percentage is between about 1% and about 5%; and
  the step of adjusting the threshold power level comprises adjusting the maximum-threshold power level up by a threshold step size.

15. The method of claim 11, wherein the threshold step size is a factor of the number of time intervals for which the transmit power level is equal to the threshold power level.

16. The method of claim 11, wherein the time interval comprises one power control group.

17. The method of claim 11, wherein the time period comprises one or more time intervals.

18. The method of claim 11, wherein:
  the step of receiving power control information comprises each of a plurality of base stations receiving power control information for each time interval, wherein each of the plurality of base stations are participating in the same soft handoff; and
  the step adjusting the threshold power level of the base station comprises:
    forwarding the power control information received on each of the plurality of base stations to a processor;
    adjusting the threshold power level by a threshold step size if the transmit power levels from all of the base stations being substantially equal to the threshold power level for at least a predetermined percentage of the time intervals; and
    forwarding the adjusted threshold power level to each base station.

19. The method of claim 18, wherein the processor is located at a mobile switching center of the wireless communication system.

20. The method of claim 18, wherein the processor is distributed between at least two of the plurality of base stations.

21. The method of claim 18, wherein the processor is distributed between at least one of the plurality of base stations and a mobile switching center of the wireless communication system.

22. A method for controlling a transmit power level of a base station in a wireless system, the method comprising the steps of:
  determining whether the base station is participating in a soft handoff;
  adjusting the transmit power level by a first amount if the base station is participating in the soft handoff and if the transmit power level of the base station is not equal to a minimum-threshold power level;
  adjusting the transmit power level by a second amount if the base station is not participating in the soft handoff, the second amount not being equal to the first amount and if the transmit power level of the base station is not equal to the minimum-threshold power level; and
  maintaining the transmit power level of the base station at least at the minimum-threshold power level, the transmit power level being equal to the minimum-threshold power level for at least 50% of a plurality of time periods.

23. The method of claim 22, wherein the time period comprises a frame.

24. The method of claim 22, wherein the maintaining step comprises:
  each base station participating in the soft handoff receiving power control information for a time interval; and
  each base station adjusting its transmit power level to be at a threshold power level if the power control information received at that base station indicating to adjust the transmit power level toward the threshold power level and if the transmit power level of that base station being within one step size of the threshold power level.

25. The method of claim 22, wherein the time period comprises a power control group.

26. A method for controlling a transmit power level of a base station in a wireless system, the method comprising the steps of:
  determining whether the base station is participating in a soft handoff;
  determining whether a reverse-link pilot power level is below a reverse link adjustment threshold;
  adjusting the transmit power level by a first amount if the base station is participating in the soft handoff and if the reverse-link pilot power level is below the reverse link adjustment threshold,
    wherein adjusting the transmit power level by a first amount comprises adjusting the transmit power level by a up-step size if there is an indication to increase the transmit power level, and wherein adjusting the transmit power level by a first amount comprises adjusting the transmit power level by a down-step size if there is an indication to decrease the transmit power level, the down-step size being larger in magnitude than the up-step size; and adjusting the transmit power level by a second amount if either the base station is not participating in the soft handoff or the reverse-link pilot power level is above the reverse link adjustment threshold, the second amount not being equal to the first amount, wherein adjusting the transmit power by a second amount comprises adjusting the transmit power level by a step size if there is an indication to adjust the transmit power level, the step size being larger than the up-step size and smaller than the down step size.

27. A method for controlling a transmit power level of a base station in a wireless system, the method comprising the steps of:

determining whether the base station is participating in a soft handoff;

determining whether a reverse-link pilot power level is below a reverse link adjustment threshold;

adjusting the transmit power level by a first amount if the base station is participating in the soft handoff and if the reverse-link pilot power level is below the reverse link adjustment threshold, wherein adjusting the transmit power level by a first amount comprises adjusting the transmit power level by a step size if there is an indication to adjust the transmit power level to form an adjusted transmit power level, and reducing the transmit power level by a reduction amount; and adjusting the transmit power level by a second amount if either the base station is not participating in the soft handoff or the reverse-link pilot power level is above the reverse link adjustment threshold, the second amount not being equal to the first amount.

28. The method of claim 27, wherein the reduction amount has a magnitude greater than zero and smaller than the step size.

* * * * *